(12) United States Patent
Zhang

(10) Patent No.: US 8,638,780 B1
(45) Date of Patent: Jan. 28, 2014

(54) SYSTEM AND METHOD FOR OBTAINING AN INTERNET ADDRESS ASSOCIATED WITH A TELEPHONE NUMBER

(75) Inventor: Qiang Zhang, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 1702 days.

(21) Appl. No.: 11/689,162

(22) Filed: Mar. 21, 2007

(51) Int. Cl.
  *H04L 12/66* (2006.01)
(52) U.S. Cl.
  USPC ............................ 370/352; 370/356; 370/401
(58) Field of Classification Search
  USPC ......................................... 370/352, 356, 401
  See application file for complete search history.

(56) References Cited

U.S. PATENT DOCUMENTS

| | | | |
|---|---|---|---|
| 7,933,392 B1* | 4/2011 | Hannan et al. | 379/111 |
| 2007/0002778 A1* | 1/2007 | Shi et al. | 370/260 |
| 2007/0022289 A1* | 1/2007 | Alt et al. | 713/168 |
| 2007/0165613 A1* | 7/2007 | Soo et al. | 370/356 |
| 2008/0037757 A1* | 2/2008 | Ku et al. | 379/220.01 |
| 2008/0130523 A1* | 6/2008 | Fridman et al. | 370/259 |
| 2008/0166994 A1* | 7/2008 | Ku et al. | 455/406 |

* cited by examiner

*Primary Examiner* — Nicholas Jensen

(57) ABSTRACT

A system and method for obtaining an internet address associated with a telephone number is disclosed. In an embodiment of the present invention, a wireless carrier network includes a subscriber database and an ENUM gateway. The ENUM gateway receives an ENUM query related to a subscriber of the wireless carrier from a third party, consults the subscriber database in response to the received ENUM query, and provides an ENUM response to the ENUM query to the third party after consulting the subscriber database.

15 Claims, 2 Drawing Sheets

SYSTEM AND METHOD FOR OBTAINING AN INTERNET ADDRESS ASSOCIATED WITH A TELEPHONE NUMBER

FIELD OF THE INVENTION

The present invention relates generally to the field of telecommunications, and in particular, to a system and method for obtaining an internet address associated with a telephone number.

BACKGROUND OF THE INVENTION

The convergence of telephony and the Internet is ever increasing. For this capability, telephone numbers must be linked to Internet service addresses. The Internet Engineering Task Force (IETF) has developed protocols that use the Internet's Domain Name System (DNS) to map telephone numbers to Internet addresses. This telephone number mapping is generally referred to as ENUM (tElephone NUmber Mapping).

A publicly accessible database, such as that provided by NeuStar or other ENUM providers, maintains mappings for telephone numbers to Internet addresses. Thus, when a telephone user dials a telephone number that is related to an Internet service with which the user desires to communicate, the carrier network of the telephone user sends an ENUM DNS query to the ENUM provider database to obtain the mapped Internet address for the telephone number. In response to the query, the ENUM provider sends an ENUM response to the carrier network that includes the Internet address (DNS RR) that is mapped to the telephone number. The carrier network then establishes the connection between the telephone and the Internet service by using the mapped Internet address.

Since the ENUM provider database is not directly linked to service provider networks for real-time updating of telephone number information related to subscribers of the service provider networks, the information in the ENUM provider database can become inaccurate or may not otherwise be available. Thus, in response to the ENUM query, a 404-Not-Found error message may be returned to the device, program, or network initiating the call.

Further, the present system has particular disadvantages in the context of subscribers to a Mobile Virtual Network Operator (MVNO). The MVNO service profile identifier/original called number (SPID/OCN), and corresponding mapped Uniform Resource Identifier (URI) in the Naming Authority Pointer (NAPTR) ENUM record, are not properly identified in today's ENUM system. Only the main carrier that hosts the MVNO is identified with dedicated SPID. Therefore, the NAPTR records for the SPID are being carrier over to the MVNOs, but they may not be correct. For example, Boost subscribers will be identified as Nextel users in the ENUM directory. This can lead to confusion on routing and billing for content service providers/aggregators that do the ENUM lookup.

Also, because the current ENUM databases contain rather static information and need regular maintenance and co-operation from carriers to keep the stored information current, these databases are particularly not able to deal with wireless number portability (WNP) ported numbers in real time.

Therefore, it would be desirable to provide an improved system and method for obtaining an internet address associated with a telephone number.

SUMMARY OF THE INVENTION

A system and method for obtaining an internet address associated with a telephone number is provided. In an embodiment of the present invention, a wireless carrier network includes a subscriber database and an ENUM gateway. The ENUM gateway receives an ENUM query related to a subscriber of the wireless carrier from a third party, consults the subscriber database in response to the received ENUM query, and provides an ENUM response to the ENUM query to the third party after consulting the subscriber database.

DETAILED DESCRIPTION OF THE EXEMPLARY EMBODIMENTS

Figure 1:
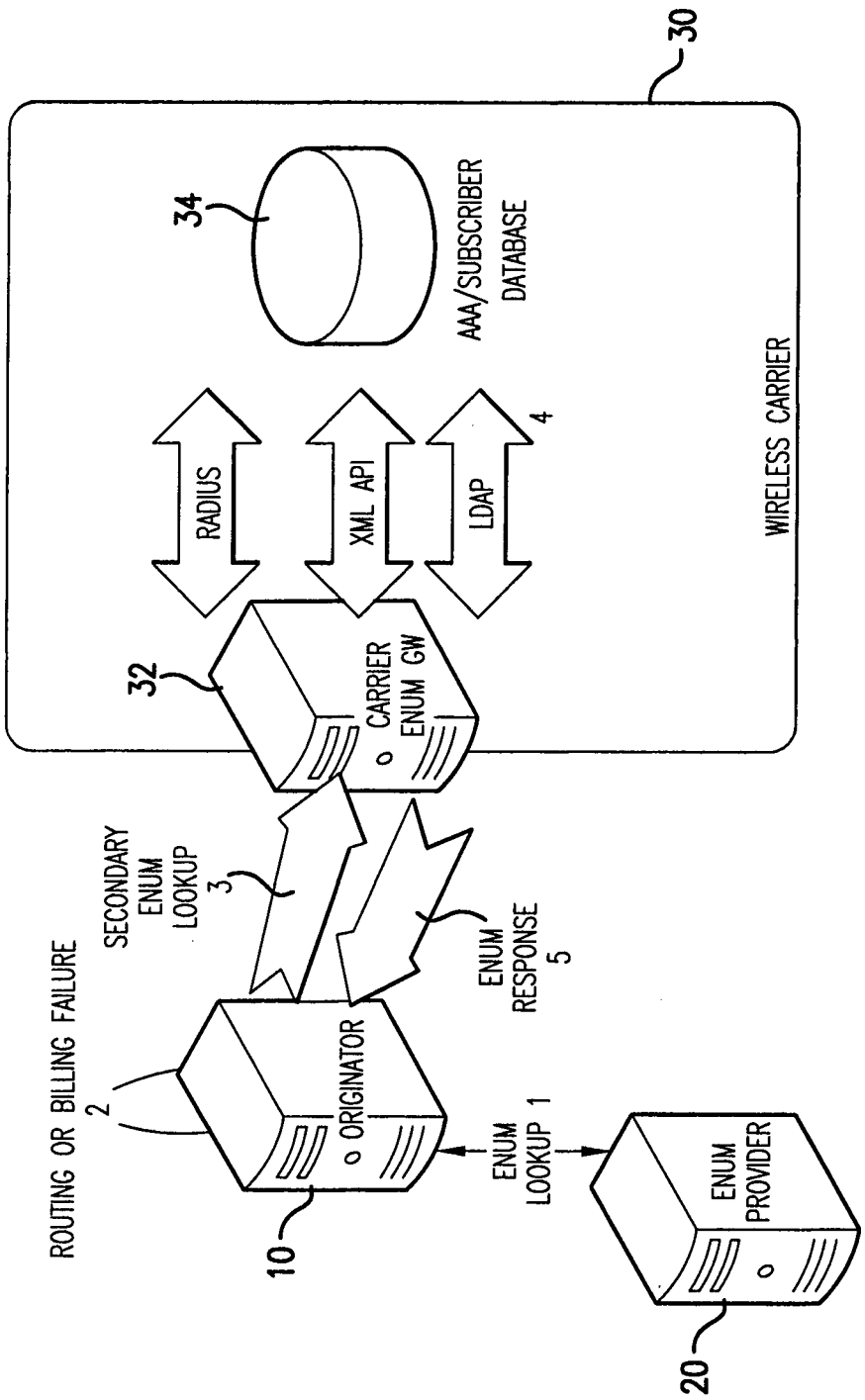
FIG. 1 illustrates an embodiment of a system of the present invention with a first embodiment of a method of the present invention.
Figure 2:
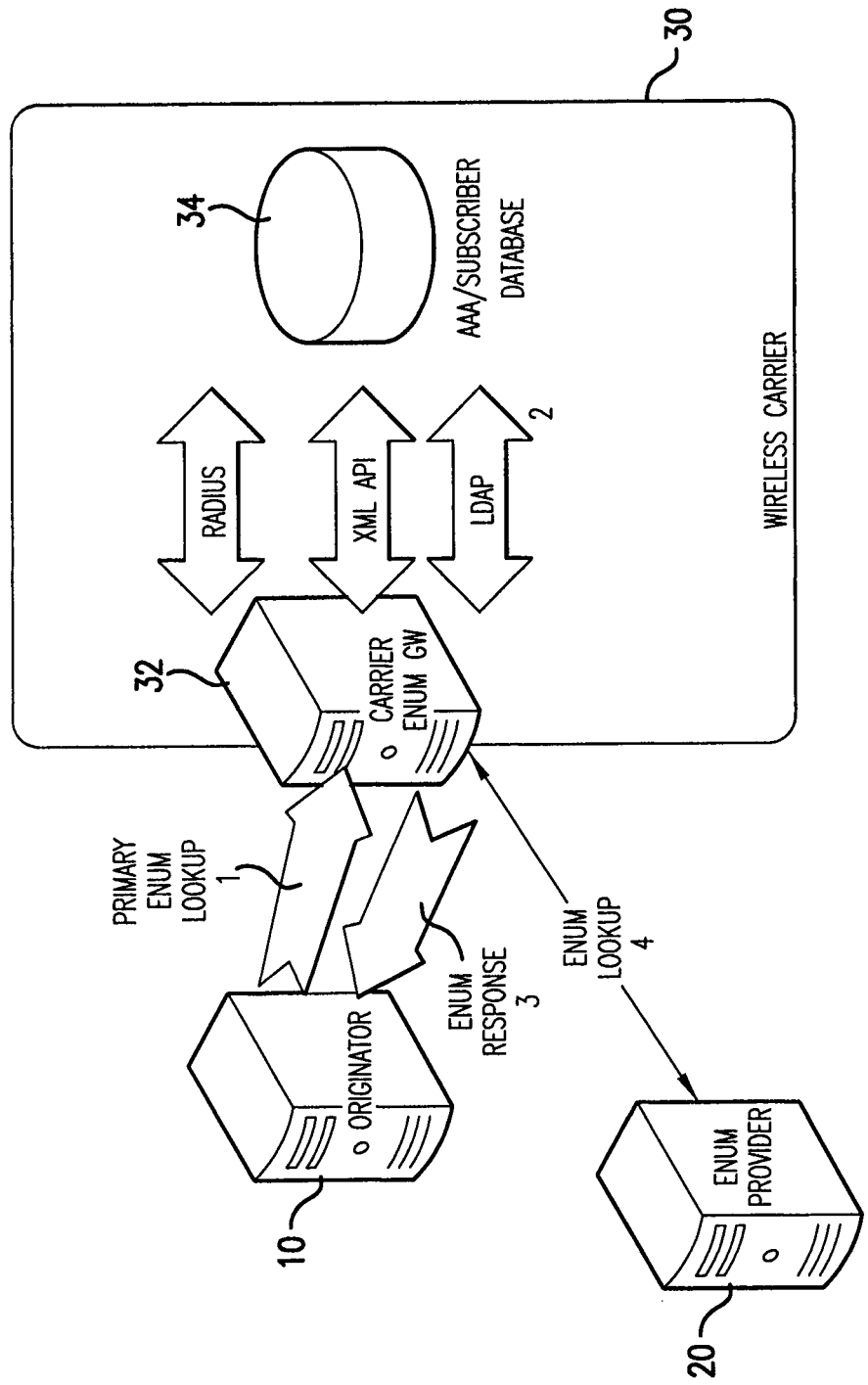
FIG. 2 illustrates the embodiment of the system of the present invention of FIG. 1 with a second embodiment of the method of the present invention.

As will be further explained below, and as can be seen in FIGS. 1 and 2, the present invention includes a carrier ENUM gateway (CEG) which serves as an ENUM directory. The front end interface of the gateway is compliant with ENUM DNS protocol and RRs, and supports necessary DNS related security, e.g., DNSSEC, TKEY, TSIG, etc. Optionally, the front end can support IPv6 address lookup. The backend of the gateway interfaces with the wireless carrier network's internal subscriber authentication, authorization, and accounting (AAA) interfaces, e.g., LDAP, RADIUS, or XML API. The gateway can, in real time, receive an ENUM query for a telephone number and poll the backend AAA/subscriber database to quickly form an ENUM response with filled NAPTR RRs. The gateway also provides ENUM forwarding to a public, official ENUM directory, such as provided by NeuStar.

The present invention includes at least two embodiments of a method of operation. First, the system can be used as a secondary lookup directory when the first lookup is not sufficient or failed to meet the need. For example, a content provider can perform a lookup from an official ENUM directory and only be able to get the main carrier ID for the subscriber, which can lead to a billing failure. In this circumstance, the content provider can then query the CEG of the present invention as a further effort to locate the right record for the subscriber. In a second method of operation, the present invention can be used as the primary lookup directory, e.g., as the default directory, for the carrier's internal IP Multimedia Subsystem (IMS), messaging systems, and content providers or messaging/VoIP aggregators. The initial lookup/query is sent to the CEG where the CEG consults the internal database. If the record is available, then no further forwarding of the query is required and the CEG provides the ENUM response to the content provider. If no record is returned for the subscriber from the database, the CEG forwards the query to the official ENUM database, again such as provided by NeuStar.

Therefore, in accordance with the principles of the present invention, the carrier ENUM gateway exposes the wireless carrier's subscriber database, via an ENUM DNS interface, to any third party that is interested in a service lookup for a telephone number belonging to this wireless carrier. The exposed ENUM interface works seamlessly with those ENUM lookup originating parties that already have ENUM client capabilities.

As explained above, there are at least two embodiments of the method of the present invention. FIG. 1 illustrates the system and first embodiment of the method of the present invention. As can be seen, a third party vendor 10 sends an ENUM (DNS) query 1 to a Tier 1 ENUM provider 20, such as NeuStar or other public ENUM service providers, via normal ENUM lookup at e164.arpa root domain. Since the ENUM provider 20 does not contain a record for the query based on the telephone number sent by the third party vendor 10, or at least the ENUM provider 20 is not able to locate such a record based on the query sent by the vendor 10, the query fails to return a record. Thus, as shown in process step 2, the third party vendor 10 fails to determine routing or billing information for the communications request. Since the third party vendor 10 already knows the main carrier domain for the failed subscriber, in process step 3, the vendor 10 further consults the corresponding carrier ENUM gateway 32 for more detailed subscriber service information. As is shown, carrier ENUM gateway 32 is associated with wireless carrier 30, and thus the network of the wireless carrier. A typical scenario where the first method of use of the system of the present invention is useful is that for MVNO subscribers. With MVNO subscribers, a content provider 10 will not know the subscriber is an MVNO subscriber through a normal ENUM service. Therefore, the billing and routing can fail in response to the primary ENUM lookup query 1. Then, in response to this failure, the provider 10 sends a secondary ENUM query 3 to the carrier ENUM gateway 32. The carrier ENUM gateway 32 parses the ENUM query (and performs necessary security enforcement as well) and, through process step 4 in communications with the wireless carrier's backend subscriber AAA system/subscriber database 34, e.g., using LDAP, XML API or RADIUS, the CEG 32 pulls the needed DNS RR from the carrier's backend subscriber AAA system/database 34. In process step 5, an ENUM response is provided to the provider 10. In providing the ENUM response, the carrier ENUM gateway forms the ENUM response with the proper NAPTR RR.

Thus, in the first embodiment of the method of the present invention, the carrier ENUM gateway is used as a secondary ENUM lookup mechanism and provides the interface to the carrier's subscriber database for the required DNS RR when the primary search to a public ENUM provider fails.

FIG. 2 illustrates the system and second embodiment of the method of the present invention. In this embodiment, in process step 1, the originator 10 (user of the ENUM system), by default, performs the ENUM lookup from the CEG 32 first. Thus, it is the primary ENUM lookup. As with the embodiment of FIG. 1, in process step 2, the CEG 32 consults the internal AAA system/database 34 for the subscriber. If the record is available through this process step(s), then the CEG provides the ENUM response to the content provider in process step 3. If no record is returned for the subscriber from the database 34, in process step 4, the CEG 32 forwards the query to the official ENUM database 20, again such as provided by NeuStar, to try to obtain this information from database 20. If the information is available from Tier 1 ENUM provider 20, the CEG 32 uses this information provided from database 20 to CEG 32 to form the ENUM response with the proper NAPTR RR and send the response to the originator 10 in process step 3.

Thus, with the system and second embodiment of the method of the present invention, the carrier ENUM gateway 32 is used as the primary ENUM lookup mechanism. If the required DNS RR is retrieved from the carrier's subscriber database 34, the ENUM response is sent to the originator 10 by CEG 32. If no record is returned from the subscriber database 34, the CEG 32 then attempts to retrieve the record from the public ENUM provider 20 for further transfer to originator 10. In this method, regardless of how the required DNS RR is obtained, e.g., from the carrier database 34 or the public database 20, the CEG 32 is the primary ENUM lookup mechanism.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for obtaining an internet address associated with a telephone number, comprising:
   a wireless carrier network including:
      a subscriber database including subscriber information of at least one subscriber of the wireless carrier network; and
      a telephone number mapping (ENUMI gateway;
   wherein the ENUM gateway has a first interface and a second interface and is configured to:
      receive an ENUM query related to a target subscriber of the wireless carrier network from a third party using the first interface, wherein the ENUM query comprises a telephone number of the target subscriber;
      consult the subscriber database in response to the received ENUM query to obtain information related to the target subscriber using the second interface;
      forward the ENUM query to a public ENUM database using the first interface of the ENUM gateway when the subscriber database does not include the information related to the target subscriber requested by the third party, wherein the public ENUM database is external to the wireless carrier network and not directly linked to any wireless carrier network operator;
      receive a response to the ENUM query from the public ENUM database using the first interface of the ENUM gateway, wherein the response comprises information related to the telephone number of the target subscriber; and
      provide an ENUM response to the ENUM query to the third party including the information related to the target subscriber requested by the third party using the first interface of the ENUM gateway, wherein the third party uses the ENUM response to the ENUM query for routing purposes and billing purposes.

2. The system according to claim 1, wherein the information related to the target subscriber requested by the third party includes a Domain Name System (DNS) resource record (RR).

3. The system according to claim 1, wherein the wireless carrier network further includes an authentication, authorization, and accounting (AAA) system coupled to the second interface of the ENUM gateway and associated with the subscriber database.

4. The system according to claim 1, wherein the ENUM gateway consults the subscriber database based on subscriber information contained in the received ENUM query.

5. The system according to claim 1, wherein the information related to the telephone number of the target subscriber comprises an internet address associated with the telephone number of the target subscriber.

6. The system according to claim 1, wherein the first interface of the ENUM gateway uses at least one of an ENUM Domain Name System (DNSI protocol and an IPv6 address lookup and the second interface of the ENUM gateway uses the protocol compatible with the subscriber database.

7. A method for obtaining an internet address associated with a telephone number, comprising:

receiving, at a first interface of a telephone number mapping (ENUM) gateway of a wireless carrier network, an ENUM query related to a target subscriber of a wireless carrier network from a third party, wherein the ENUM query comprises a telephone number of the target subscriber;

consulting, by the ENUM gateway, a subscriber database including subscriber information of at least one subscriber of the wireless carrier network using a second interface of the ENUM gateway in response to the received ENUM query to obtain information related to the telephone number of the target subscriber;

forwarding, by the first interface of the ENUM gateway, the ENUM query to a public ENUM database, when the subscriber database does not include the information related to the target subscriber requested by the third party, wherein the public ENUM database is external to the wireless carrier network and not directly linked to any wireless carrier network operator; and receiving, by the first interface of the ENUM gateway, a response from the ENUM query from the public ENUM database, wherein the response comprises information related to the telephone number of the target subscriber, wherein the third party uses the response from the ENUM query for routing purposes and billing purposes.

8. The method according to claim 7, wherein the information related to the target subscriber includes a Domain Name System (DNS) resource record (RR).

9. The method according to claim 7, wherein the second interface of the ENUM gateway is coupled to an authentication, authorization, and accounting (AAA) system associated with the subscriber database.

10. The method according to claim 7, wherein the ENUM gateway consults the subscriber database based on subscriber information contained in the received ENUM query.

11. The method according to claim 7, further comprising:

porting a telephone number of the subscriber to the wireless carrier network;

storing information related to the ported telephone number in the subscriber database; and utilizing the stored information related to the ported telephone number in the ENUM response.

12. The method according to claim 7, wherein the ENUM response includes a naming authority pointer (NAPTR) resource record (RR).

13. The method according to claim 7, wherein the target subscriber is a subscriber to a mobile virtual network operator (MVNO) that utilizes the wireless carrier network.

14. The method according to claim 7, wherein the information related to the telephone number of the target subscriber comprises an internet address associated with the telephone number of the target subscriber.

15. The method according to claim 7, wherein the first interface of the ENUM gateway uses at least one of an ENUM Domain Name System (DNSI protocol and an IPv6 address lookup and the second interface of the ENUM gateway uses the protocol compatible with the subscriber database.

* * * * *